United States Patent

[11] 3,626,791

| [72] | Inventor | Paul D. Henderson<br>Avon, Conn. |
|---|---|---|
| [21] | Appl. No. | 37,740 |
| [22] | Filed | May 15, 1970 |
| [45] | Patented | Dec. 14, 1971 |
| [73] | Assignee | The Superior Electric Company<br>Bristol, Conn. |

[54] INDEXABLE TURRET STOP ASSEMBLY
8 Claims, 4 Drawing Figs.

[52] U.S. Cl. ........................................... 82/34 D
[51] Int. Cl. ........................................... B23b 25/06
[50] Field of Search ........................................... 82/34 A, 34 D

[56] References Cited
UNITED STATES PATENTS

| 2,148,348 | 2/1939 | Groene et al. | 82/34 D |
|---|---|---|---|

FOREIGN PATENTS

| 1,167,652 | 10/1969 | Great Britain | 82/34 D |
|---|---|---|---|
| 1,221,878 | 7/1966 | Germany | 82/34 D |

*Primary Examiner*—Leonidas Vlachos
*Attorney*—Johnson and Kline

ABSTRACT: A turret stop assembly for use with a machine tool for controlling the extent of movement of a tool in which there is a plurality of adjustable stops and indexing means for positioning the stop desired to control the tool. The indexing means is permanently mounted on the tool while the adjustable stops are mounted on a turret which is only detachably secured to the indexing unit to enable easy replacement of one turret with preset adjustable stops for another with a different set of preset adjustable stops.

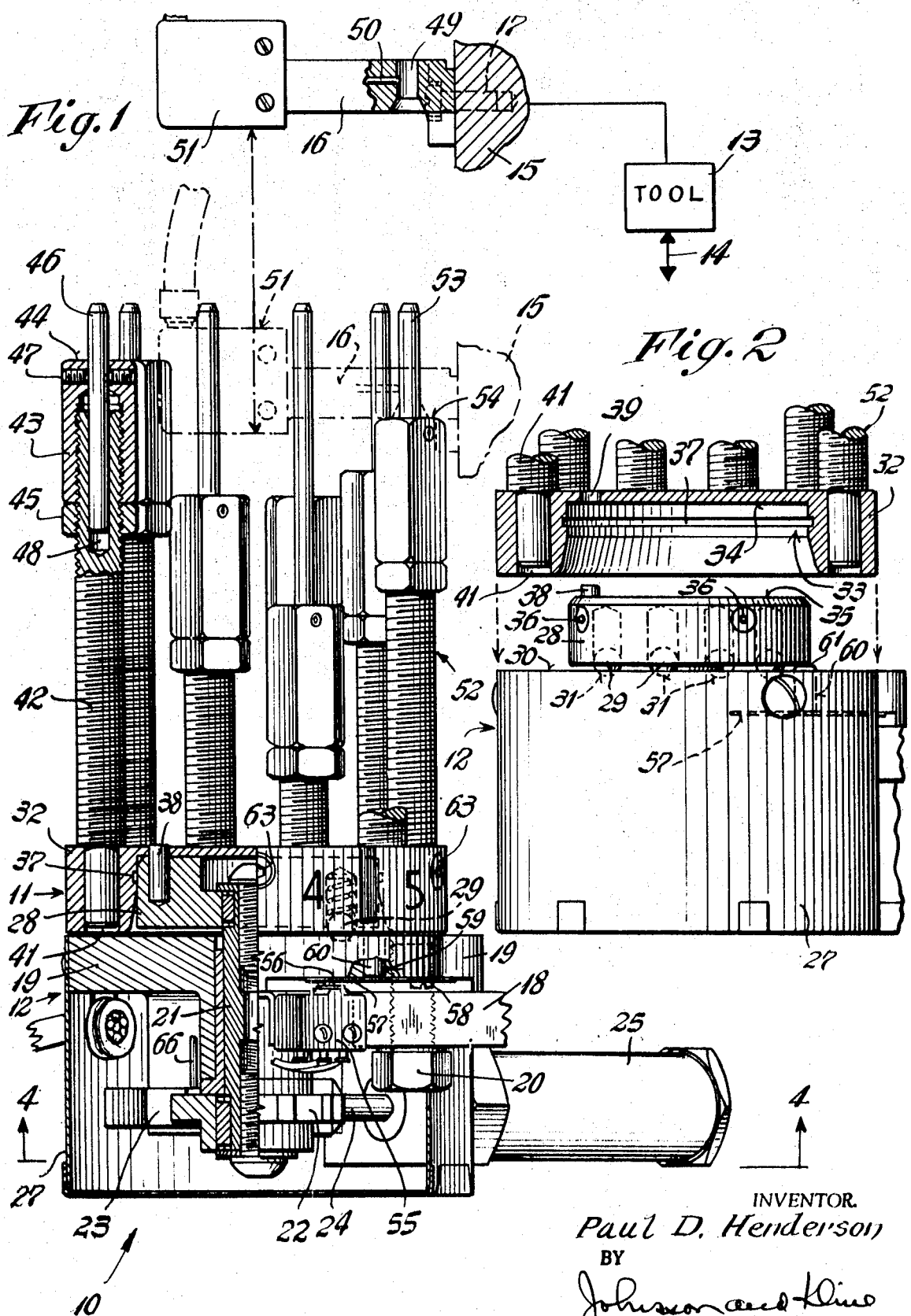

Patented Dec. 14, 1971 3,626,791

INVENTOR
Paul D. Henderson
BY Johnson and Kline
ATTORNEYS

INDEXABLE TURRET STOP ASSEMBLY

The present invention relates to an attachment which is utilizable on a machine tool having a displaceable tool such as a drill, vertical miller, lathe, etc., in which it is desired to automatically limit the extent of movement of the tool. A mechanical stop is positioned in the path of movement of the tool-moving means of the tool until the stop is engaged at which position the engagement effects actuation of a switch or other device for stopping the tool and usually reversing its movement. In order to set the length of movement, the stop is made to be easily adjustable or presettable to the desired position along the path of movement of the tool. Moreover, as there may be many different stop positions at which it is desired to stop the tool, it has been suggested that a plurality of presettable stops be mounted on an indexing mechanism with each stop adjusted to one of the different positions and with the mechanism indexing the stops to have only the selected stop be operable to stop the tool-moving means.

While such an assembly of an indexing means and a plurality of stops has heretofore been suggested, it has been found that these prior indexing assemblies have not been completely satisfactory. One instance occurs where there may be more desired stopping positions than there are stops available to be indexed to perform a series of operations on a workpiece. Another instance occurs when it is desired to be able to change the preset stops with changing of the operation of the machine and/or to adjust one set of stops while the machine is operating using a different set of stops. Heretofore the stops and the indexing mechanism have been interconnected both together and to the machine so that the substitution of one set of stops for another basically required the substitution of one indexing assembly for another on the machine tool.

It is accordingly an object of the present invention to provide a turret stop assembly which includes an indexing base and a turret unit that contains a plurality of presettable stops with the turret unit only being releasably secured to the indexing base thereby facilitating the replacement of one turret unit for another on the indexing base.

Another object of the present invention is to provide a turret stop assembly in which the extent of tool movement may be easily preset and precisely operated at the set positions to effect an accurate control over the tool movement.

A further object of the present invention is to provide an automatically indexable turret stop assembly which overcomes the above-noted disadvantages of heretofore suggested assemblies while achieving the above-noted objects and yet is economical to manufacture, reliable in use and capable of being utilized with a plurality of different tool movement machines and especially machines equipped with numerically controlled systems.

In carrying out the present invention, the turret stop assembly has an indexing base that includes a frame which is securely mounted on the machine tool. The frame carries a rotatable shaft which may be automatically indexed or rotated to stop at a plurality of predetermined positions with the shaft having an axis that is essentially parallel with the reciprocating movement of the tool.

An end of the shaft projects outwardly above the indexing mechanism and the turret unit is accurately positioned thereon and maintained in position by releasable fastening means carried by the shaft and turret unit. Specifically, the cooperating latching member on the shaft is a cylindrical disk while the turret unit cooperating member is essentially an annular member which mates with the disk and the releasable securing means includes indentations formed in the annular member and spring urged projections carried by the disk. Thus the turret unit may be easily removed from the indexing base to be replaced by another turret unit, manually without requiring the use of a tool.

The turret unit includes a plurality of adjustable stops each of which may be set to any presettable position within the limits of the turret stop assembly along the path of movement of the tool. The stops are positioned on the turret unit's annular member to correspond with the positions to which the indexing base is indexable with the base and turret unit carrying cooperating aligning means for aligning the unit with the base. Furthermore, the indexing base is mounted on the machine tools such that only one stop is at the indexable position which is in alignment with a bracket carried by the tool moving means and hence constitute the only stop for setting the extent of movement. By indexing the shaft to a different index movement. the stop which is positioned in alignment with the bracket is thus changed to set a different extent of movement.

In use, the tool is actuated to move towards the workpiece and will continue such a movement until it received an electrical signal indicating that the movement should be stopped and immediately reversed. This is achieved by the indexing base including an electrical switch which has an actuator that extends outwardly thereof to be positioned adjacent the periphery of the disk. The disk is spring urged away from the actuator and thus also urges the turret unit away from the actuator. However, as the bracket initially engages the selected stop, it will have a further movement which also moves the stop and the turret unit against the action of the spring urged shaft until the base of the turret unit engages the actuator and moves it sufficiently to cause the switch to provide the reversing electrical signal. An important feature of the present invention is the engagement of the actuator by the turret unit and multiplying of the turret movement on the actuator to a movement on the switch actuating button through the use of a lever to thereby effect greater precision over the stop location.

Other features and advantages will hereinafter appear.

In the drawing:

FIG. 1 is an elevation, partly in section of the indexing turret stop assembly of the present invention shown mounted with respect to a movable tool of a machine tool.

FIG. 2 is a view similar to a portion of FIG. 1, illustrating the turret unit being separated from the indexing base with the turret unit being shown in section.

Figure 3:
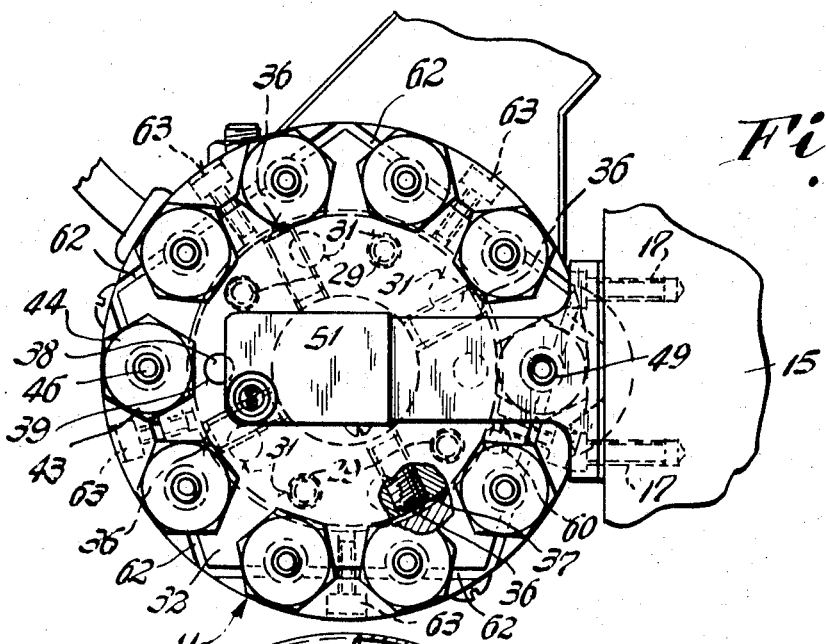
FIG. 3 is a plan of the indexing turret stop assembly.
Figure 4:
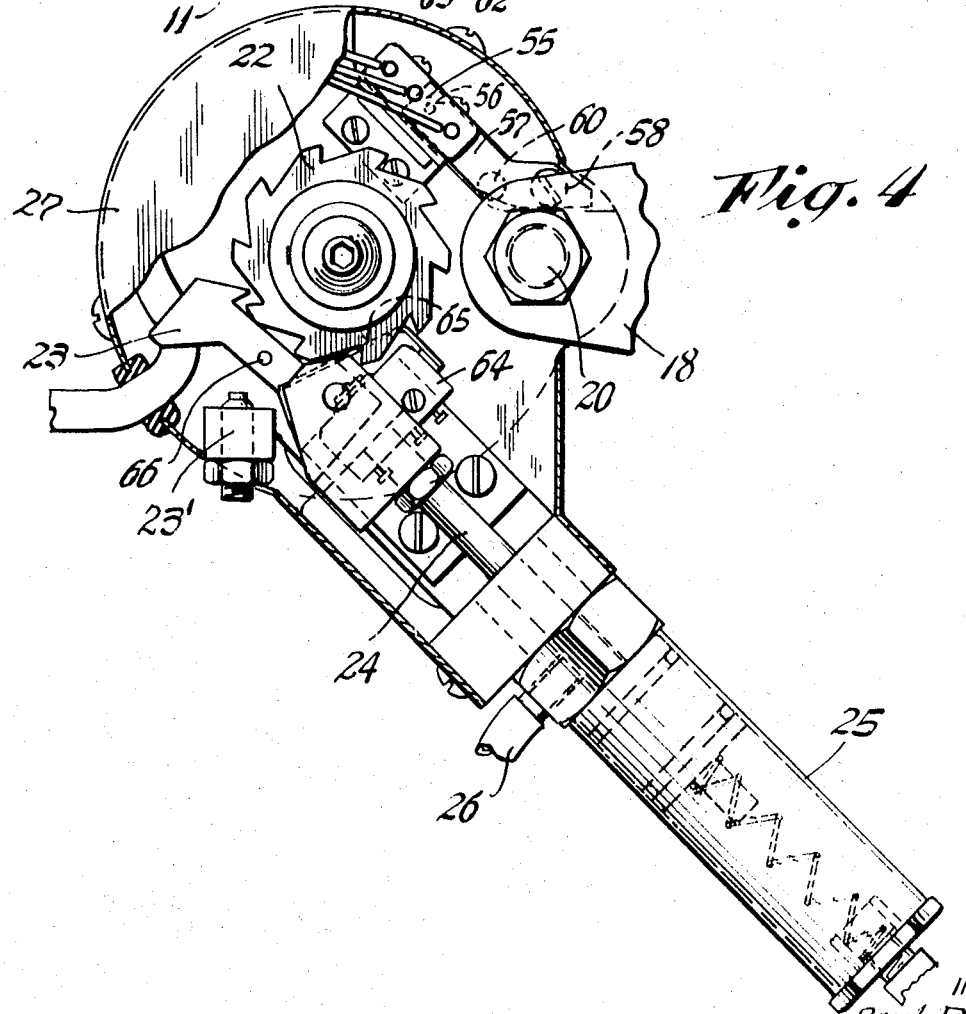
FIG. 4 is a section with portions broken away taken on line 4-4 of FIG. 1.

Referring to the drawing, the indexing turret stop assembly of the present invention is generally indicated by the reference numeral 10 and includes a turret unit 11 having a plurality of stops and an indexing base 12. A tool is diagrammatically shown by a block 13 and is caused to move or reciprocate along a path indicated by the arrow 14 by a tool moving means of a machine tool, a portion of which is indicated at 15. Also connected to the tool moving means 15 is a bracket 16 such that the bracket 16 moves simultaneously and identically with the tool moving means with screws 17 serving to provide the positive securement.

For mounting the indexing base on the machine, the machine has a mounting ear 18 of essentially conventional construction to which a frame 19 of the indexing base is secured by mean of a bolt 20. Rotatably supported within the frame 19 is a shaft 21 having a ratchet wheel 22 secured on its lower end and being engageable by a pawl 23 secured on a piston rod 24 of a spring-urged air cylinder 25. Accordingly, air introduced into the cylinder 25 through an opening 26 will cause the piston rod 24 to be retracted into the cylinder with the result that the pawl will rotate the ratchet wheel and hence the shaft one indexable position. The pawl and ratchet wheel are shaped to cooperate with the adjustable stop 23' to positively prevent movement past the indexable position, there being equally spaced 10 positions herein.

A sheet metal cover 27 encloses the indexing base with the shaft projecting beyond the cover to have a disk 28 secured thereto. Contained within the disk 28 are a plurality of spring-urged balls 29 which are urged against a surface 30 of the frame, the latter being formed as a plurality of cooperating indentations 31. The balls 29 and indentations 31 are so located that a ball is forced into an indentation when the shaft 21 is at one of its ten indexable positions and thereby serve to releasably restrain the shaft accurately at each indexable position but enable an operator to rotate the shaft manually if desired. It is also pointed out that for reasons which will be hereinafter apparent, that the spring-urged balls also tend to urge the shaft and disk 28 upwardly away from the surface 30 of the frame.

The turret unit 11 is designed to be detachable secured to the indexing base 12 by being accurately but releasable mounted on the disk 28. Accordingly, the turret 11 includes an annular member 32 formed with an interior cylindrical recess 33 which closely mates with the periphery of the disk 28 and an inner flat surface 34 which abuts the top surface 35 of the disk. The recess 33 and disk periphery are dimensioned to precisely mate with each other and for accurately holding the member 32 on the disk cooperating releasable fastening means are provided. Specifically, the fastening means includes a plurality of spring-urged balls 36 on the disk that project to cooperate with indentations 37, specifically an annular groove formed in the inner periphery of the wall of the recess 33. The turret unit 11 is accordingly accurately positioned on the indexing base 12 by positioning the member 32 on the disk 28 until the surfaces 34 and 35 abut and the balls 36 are located in the groove 37. To assure rotational alignment between the turret unit and the disk 28, the disk 28 carries an upstanding pin 38 which cooperates with an aperture 39 formed in he member 32 and thus there is only one rotational position that the unit can be positioned on the base.

It will thus be understood that the use of the detachable securing means 36 and 37 enable the turret to be both positioned accurately on the indexing base manually without the use of tools and that while the turret is held sufficiently rigid on the indexing base during use, enables it to be removed manually, also without the use of tools.

The outer portion of the turret annular member 32 is formed with ten equally spaced apertures such as aperture 41 in which is positioned an end of a threaded shaft 42. Threaded on the shaft is a stop nut 43 with the stop nut being rotatably adjustable axially along the shaft to have its upper end 44 set at the position at which tool movement is desired to be terminated and then locked in place by a locking nut 45. As shown, the height of the shaft 42 may be varied to accommodate different ranges of stop positions with the final precise adjustment within the range being made by the position of the nut on its respective shaft.

In some operations it is desired to have the tool move rapidly until it engages the work and then move slowly as it performs an operation on the work. Wherever it is desired to automatically control the shifting from the fast to the slow movement, each stop may contain a thin rod 46 that passes through the surface 44 of the stop nut 43 and is secured to the stop nut as by setscrews 47. The shaft 42 may be hollow as at 48 to accept the remaining portion of the rod 46. Referring to the bracket 16 (FIG. 1) it is formed with an aperture 49 which is designed to slidingly accommodate the rod 46 while a pin 50 is supported in a cross bore. The movement of the pin 50 caused when the rod 46 enters and is within the aperture 49 is utilized to actuate an electrical snap action switch contained within the enclosure 51. This switch may be connected to the tool-moving means in any desired manner to cause, when actuated, a shifting of the speed of the tool moving means from a rapid travel to a slow work-performing travel. It will be understood that the length of the rod 46 which projects above the stop nut surface 44 determines the portion of the tool movement which is traversed at a slow work-performing rate.

In the operation of the indexing turret assembly, the tool moving means is caused to move the tool downwardly in the direction of the arrow 14 and as it moves the bracket 16 moves therewith. One of the stops, such as the stop 52, has been preset to control the extent of movement of the tool and has been indexed to be positioned in the path of movement of the bracket 16. As the bracket moves downwardly with the tool, the end of the rod 53 will initially enter the aperture 49 and cause actuation of the switch within enclosure 51 to shift the speed of movement to a slow speed. The tool and bracket will continue moving downwardly until the bracket engages the surface 54 of the stop 52.

The tool moving means will continue moving the tool and bracket downwardly after engagement between the surface 54 and the bracket 16 and will also cause a downward movement of the turret unit 11 against the upward urgings of the spring-urged balls 29. This downward movement of the turret unit is utilized to effect closure of a snap action switch 55 mounted in the indexing base. The switch 55 is electrically connected to the tool-moving means to effect a reversal of movement thereof as is well known in the art. The switch 55 has a button actuator 56 which is engaged by a flat leaf spring 57 secured as by screws 58 to the frame 19. The frame also has an aperture 59 in which is positioned a pin 60 with its top surface 61 projecting slightly above the surface 30 of the frame. Thus, as the bracket 16 forces stop 52 downwardly it will also force the turret unit downwardly until the bottom surface of the annular member 32 engages the top surface 61 of the pin 60 and continued movement of the bracket 16 will cause the pin 61 to actuate the switch 55 through the leaf spring 57 and button 56 and thus terminate movement of the tool and effect reversing movement thereof.

It will be appreciated that by having the button actuator 56 positioned at one end of the leaf spring 57 and the pin engaging the leaf spring between its support 58 and the button 56 that the movement of the pin 60 becomes a multiplied movement on the button actuator 56. Accordingly, a more precise setting of the position at which the switch 55 will be actuated it achieved. It is also pointed out that the annular member 32 while having through aperture 41 to receive the shaft 42 at ten positions does not have an aperture 41 in alignment with the pin 60 when the turret is at any one of its 10 indexable positions.

While the shafts 42 may be secured in the member 32 in any desired manner, in the specific embodiment shown five chordal slits such as slit 62, are formed into the top surface of the member 32 and a setscrew 63 is used to compress the slit and thereby frictionally grasp the two shafts which are positioned in the apertures 41 through which each slit passes.

The indexing turret assembly is preferably utilized with a numerical control machine tool system in which whenever it is desired to index the assembly to the next stop, a signal is used to control the flow of air into the opening 26. To terminate the airflow and to open the inlet 26 to atmospheric pressure to enable the piston rod to be spring forced outwardly after the shaft has been indexed its one position, there is provided an electrical switch 64 mounted within the indexing base and having a lever arm 65. The pawl 23 carries a pin 66 which projects upwardly and as the piston rod pulls the pawl to effect indexing, the pin 66 will engage the lever arm 65 and effect actuation of the switch 64 to terminate the indexing movement and permit the piston rod to be spring urged to its normal outwardly extending position.

It will accordingly be appreciated that there has been disclosed a turret stop assembly having a plurality of stops in which the selected stop may be indexed to effect control over the extent of movement of a tool. The assembly includes an indexing base that is securely fastened to the machine tool and a turret unit which is detachably removable, without tools, from the indexing base. When supported on the base the turret unit, having a plurality of stops is capable of being indexed by the base to position the desired stop in the position which controls the extent of movement. The turret unit may be easily replaced on the indexing base thereby enabling shifting from one set of stops to another without any alteration in the indexing base. Moreover, the turret unit is precisely positioned on the base and its movement against a spring-urged portion of the base caused by tool moving means is utilized to effect a precise control over the actuation of an electrical switch which effects reversal of the tool movement.

Variations and modifications may be made within the scope of the invention and portions of the improvements may be used without others.

I claim:

1. An indexing turret stop assembly for use with a machine tool having a tool-moving means movable along a path comprising an indexing base including a frame member, a shaft rotatably mounted on said frame member, means for rotatably indexing said shaft to a plurality of set positions, a latching support member carried by the shaft and switch means carried by the frame and adapted upon actuation to terminate movement of the tool-moving means; a turret unit including a latching support member having a plurality of positions, a plurality of adjustable stop members with there being a stop member mounted in at least some of said positions and with each of said stop members including an upstanding portion; said latching support member of the indexing base cooperating with the latching support member of the turret unit for detachably securing said turret unit on said base support member for movement therewith with the stop members extending parallelly with the axis of the shaft; means carried by the frame for mounting the frame on the machine tool with the axis of the shaft extending parallel to the path of movement of the tool-moving means and with each set position being positionably in the path of movement of the tool-moving means and means for actuating the switch means when the tool-moving means has engaged the stop member positioned in the path of movement thereof to thereby provide a signal for terminating movement of the tool-moving means.

2. The invention as defined in claim 1 in which the latching support member of the indexing base and the latching support member of the turret unit are cooperatively shaped to accurately position the turret unit on the indexing base.

3. The invention as defined in claim 1 in which the latching support member of the turret unit is rotatably positionable on said base and in which there are means for rotatably aligning the turret unit in only one position on the base.

4. The invention as defined in claim 1 in which one of the latching members includes a cylindrical member and in which the other latching unit includes an annular recess for receiving the cylindrical member.

5. The invention as defined in claim 4 in which one of the latching members includes spring-urged projections and the other latching member includes cooperating indentation means.

6. The invention as defined in claim 1 in which the shaft is mounted for axial movement, in which the switch means includes an actuating portion and in which the actuating portion is positioned to be actuated with an axial movement of the shaft.

7. The invention as defined in claim 6 in which the turret unit is mounted to move axially with the shaft and in which the turret unit includes means for engaging the actuating portion to effect actuation of the switch means.

8. The invention as defined in claim 1 in which the switch means includes an electrical switch having a button actuator, a lever cantileverly mounted on the frame and having a free end portion positioned adjacent the button actuator and in which the actuating portion engages the lever intermediate its ends to effect a multiplying of the actuating portion's movement on the button actuator.

* * * * *